United States Patent
Handgen

(10) Patent No.: US 8,429,376 B2
(45) Date of Patent: Apr. 23, 2013

(54) TRANSLATION LOOK-ASIDE BUFFER

(75) Inventor: Erin A. Handgen, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 12/989,350

(22) PCT Filed: May 21, 2008

(86) PCT No.: PCT/US2008/064294
§ 371 (c)(1),
(2), (4) Date: Oct. 22, 2010

(87) PCT Pub. No.: WO2009/142631
PCT Pub. Date: Nov. 26, 2009

(65) Prior Publication Data
US 2011/0040950 A1    Feb. 17, 2011

(51) Int. Cl.
*G06F 9/26* (2006.01)
*G06F 9/34* (2006.01)

(52) U.S. Cl.
USPC .......................................... 711/205; 711/207

(58) Field of Classification Search ........... 711/202–207
See application file for complete search history.

(56) References Cited

U.S. PATENT DOCUMENTS

| 5,426,750 | A | * | 6/1995 | Becker et al. ................. 711/207 |
| 5,455,834 | A | | 10/1995 | Chang et al. |
| 5,586,283 | A | * | 12/1996 | Lopez-Aguado et al. .... 711/207 |
| 6,029,224 | A | | 2/2000 | Asthana et al. |
| 6,430,667 | B1 | | 8/2002 | Loen |
| 2007/0033577 | A1 | * | 2/2007 | Arackal ........................ 717/124 |

FOREIGN PATENT DOCUMENTS

EP    1826676    8/2007

OTHER PUBLICATIONS

International Search Report and Written Opinion, dated Feb. 20, 2008, 11 pages.

* cited by examiner

*Primary Examiner* — Ryan Bertram

(57) ABSTRACT

A translation look-aside buffer (TLB) is described. The TLB may include a memory populated with pointers to collections (e.g., tables) of virtual-to-physical address translations. The memory may be populated by, for example, a page fault logic in response to resolving a page fault. The TLB may also include a signal logic to receive a virtual address and to selectively provide either a miss signal or a pointer to a collection of virtual-to-physical translations. The signal may provide the miss signal upon determining that the virtual address is not associated with a stored pointer and may provide a pointer upon determining that the virtual address is associated with the pointer.

14 Claims, 8 Drawing Sheets

TRANSLATION LOOK-ASIDE BUFFER

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

A conventional translation look-aside buffer (TLB) accepts a virtual address and returns one of two things, either a physical address or a signal that no virtual-to-physical address translation is stored in the TLB. If the "no translation available" signal is provided, conventional systems will typically "walk" a set of tables to determine whether information for making a virtual-to-physical address translation is stored in the set of tables. The set of tables may be referred to as a page table hierarchy. In different examples the set of tables may include a single table, a pair of tables, or more tables. The number of tables may depend on the size of the virtual address to be translated. If no information about the virtual address is stored in the set of tables, then a page fault occurs. When the page fault occurs, the page of memory is brought into memory, an entry is updated in either the TLB or the set of tables, and the virtual-to-physical address translation is attempted again.

BRIEF DESCRIPTION OF THE DRAWINGS

The accompanying drawings, which are incorporated in and constitute a part of the specification, illustrate various example systems, apparatus, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
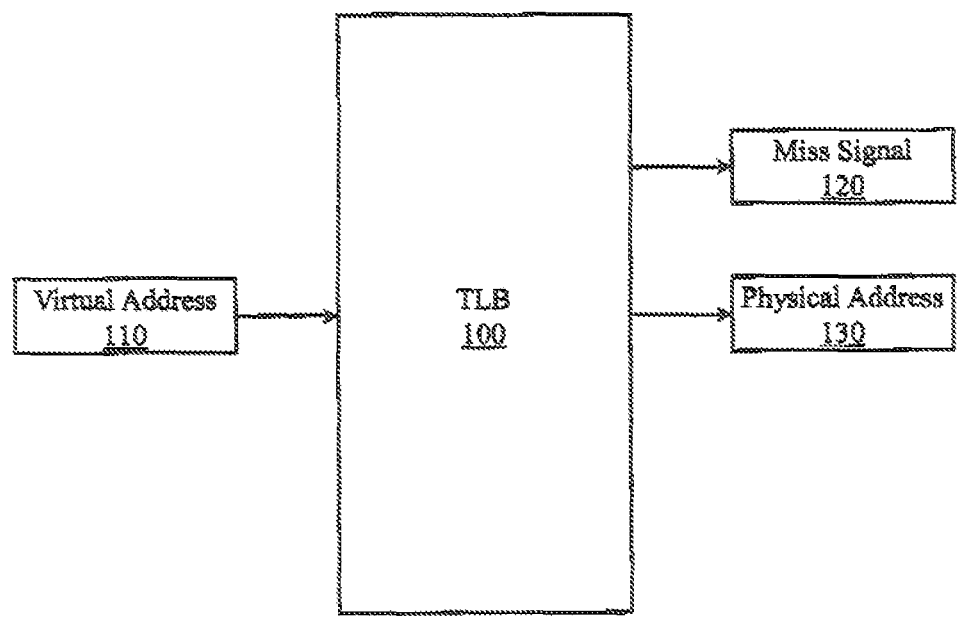
FIG. 1 illustrates a conventional TLB that provides a miss signal or a physical address.

A TLB typically stores a physical page number that corresponds to a virtual page number. Example apparatus may store pointers to tables of translations rather than storing an actual translation. Therefore, when a virtual address is provided to an example apparatus, one of two things will be returned. If the TLB has no information associated with the virtual address, then a miss signal will be produced. The association may be, for example, a match between a virtual address and stored address, a match between a virtual page number and a stored page number, and so on. If no association is made in the TLB then a conventional table walk may occur. However, in the example apparatus, if the TLB has information associated with the virtual address, then a pointer to a table will be returned. The table can then be searched for the virtual-to-physical page number translation. While a "pointer" and a "table" are described, it is to be appreciated that more generally the TLB may provide information for locating a translation stored outside the TLB. Similarly, while a pointer to a table of translations is described, it is to be appreciated that pointer to a table of pointers to tables of translations may be provided.

If a conventional TLB stored 1K (1,024) entries, then 1,024 physical page numbers may be available for translating 1,024 virtual page numbers. If the size of a physical page is 4 kilobytes (Kb), then the memory span of the system configured with the conventional TLB will be 4 megabytes (Mb). However, a large application may address millions, billions, trillions, or even more virtual addresses. Thus, taking an additional step to determine whether a virtual page number portion of a virtual address in a memory space much greater than 4 Mb is among the 1K page numbers for which a virtual address to physical address is stored in a TLB may actually slow down processor performance. However, if the TLB has 1K entries, each of which points to a group of translations, then the likelihood that a virtual-to-physical address translation is available is increased. Traversing from the TLB lookup to the table of translations takes one additional step, but may increase system performance, and/or reduce system degradation associated with TLB lookups.

When a page fault occurs in a conventional system, a TLB entry is populated with information upon which a direct virtual-to-physical address translation may be made. When a page fault occurs in one example system, a TLB entry is populated with information upon which an indirect virtual-to-physical address translation may be made. For example, the TLB entry may be populated with a pointer to a table in which information for making a direct virtual-to-physical translation is stored. The information may also include, for example, a pointer to a table of pointers, a pointer to a table of pointers to tables of pointers to translations, and so on.

In one example, a TLB may store both virtual-to-physical translations and pointers to tables of translations. In one example, when a page fault occurs, a TLB entry may be populated with a virtual-to-physical translation. When the virtual-to-physical translation is aged out of the TLB, it may be replaced with a pointer to a table of translations rather than simply discarded. The table of translations may be updated with the virtual-to-physical translation. Eventually, the translation may be aged out of the table of translations, at which time the entry may be discarded from the TLB. Thus, an example TLB may store either virtual-to-physical translations and/or pointers to tables of translations. In one example, entries in the TLB may be distinguished as being associated with either a direct virtual-to-physical translation or as being associated with an indirect virtual-to-physical translation. In one example, one bit in a TLB entry may provide the distinction.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
RAM: random access memory.
DRAM: dynamic RAM.
SRAM: synchronous RAM.
ROM: read only memory.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, a bit stream, and so on, that can be received, transmitted and/or detected.

FIG. 1 illustrates a conventional TLB 100. Conventional TLB 100 receives a virtual address 110 and provides either a miss signal 120 or a physical address 130. When the TLB 100 provides the miss signal 120, a walk of a page tree hierarchy may be initiated in an attempt to locate a page associated with the virtual address 110. If no virtual-to-physical translation is found in the page tree hierarchy, a page fault may be generated. In response to the page fault, a page may be fetched into memory, which in turn causes the TLB 100 to be updated with a virtual-to-physical translation for the recently fetched page. The virtual-to-physical translation may then be tried again, at which time the TLB 100 will provide the physical address 130.

Figure 2:
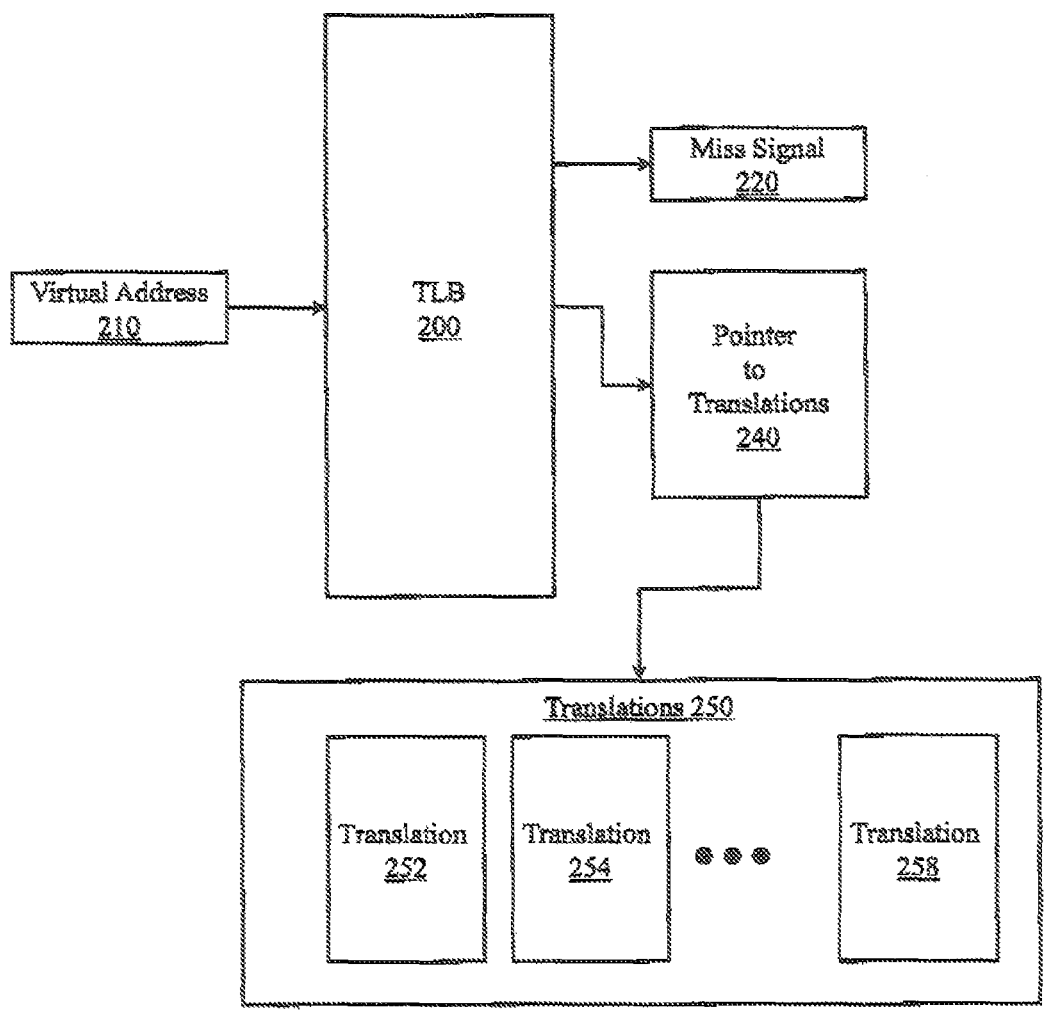
FIG. 2 illustrates an example TLB that provides a miss signal or a pointer to a set of translations.

FIG. 2 illustrates a TLB 200 that receives a virtual address 210 and provides either a miss signal 220 or a pointer 240 to a set of translations 250. The virtual address 210 may be provided as part of a virtual-to-physical address translation. Rather than store translations in TLB 200 to facilitate a direct virtual-to-physical translation, the translations 250 may be stored elsewhere to facilitate a one-step indirect virtual-to-physical translation. In one example, the set of translations 250 may be grouped together and stored in a memory. The translations 250 may be arranged in the memory as, for example, entries (e.g., translation 252, translation 254, . . . translation 258). In another example, the translations 250 may be organized and stored in a data structure in memory. The memory may be a content addressable memory that returns a physical page number when presented with a virtual page number. While a pointer 240 is described, more generally TLB 200 may provide information for locating translations 250.

Comparing TLB 200 to a conventional TLB (e.g., TLB 100 (FIG. 1)) reveals a TLB that still provides two signals, but one of the signals is different. While the miss signal 220 is the same, the pointer to translations signal 240 does not appear in conventional TLBs (e.g., TLB 100 (FIG. 100)).

Figure 3:
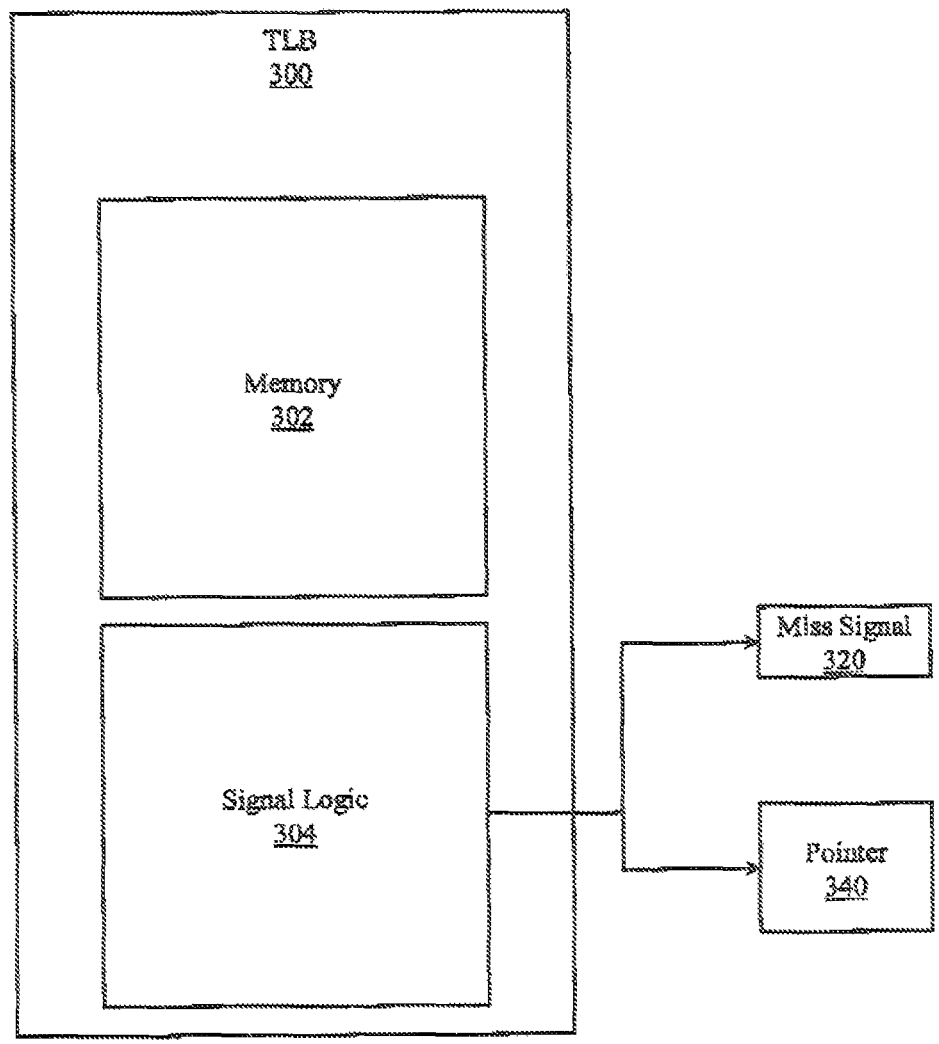
FIG. 3 illustrates an example TLB that provides a miss signal or a pointer to a set of translations.

FIG. 3 illustrates a TLB 300 that provides a miss signal 320 or a pointer 340 to a set of translations. TLB 300 includes a memory 302. Memory 302 may be a content addressable memory that when presented with a virtual address returns a pointer associated with that virtual address. Thus, memory 302 is populated with a set of pointers to tables of virtual-to-physical address translations. In one example the tables may in turn be organized in a content addressable memory. While a "table" is described, it is to be appreciated that virtual-to-physical translations may be stored in other types of data structures (e.g., list) in other types of memories.

Memory 302 may be populated in response to page fault resolution. For example, a page fault logic may fetch a page and update memory 302 with a pointer to the table in which a virtual-to-physical page number translation associated with the fetched page is stored.

TLB 300 also includes a signal logic 304 that will receive a virtual address and provide either the miss signal 320 or the pointer 340. In one example, signal logic 304 is to provide the miss signal 320 upon determining that the received virtual address is not associated with a pointer stored in the memory 302 and is to provide the pointer 340 to a translation table upon determining that the virtual address is associated with the pointer. The virtual address may take different forms depending on the machine (e.g., computer, microprocessor) with which the TLB 300 is associated. In different examples, the virtual address may be a 48 bit virtual address, a 39 bit virtual address, a 30 bit virtual address, a 21 bit virtual address, and so on. One skilled in the art will appreciate that TLB 300 may provide pointers of various lengths and have various attributes. One skilled in the art will also appreciate that virtual addresses provided to TLB 300 may have different lengths and formats and so on.

Figure 4:
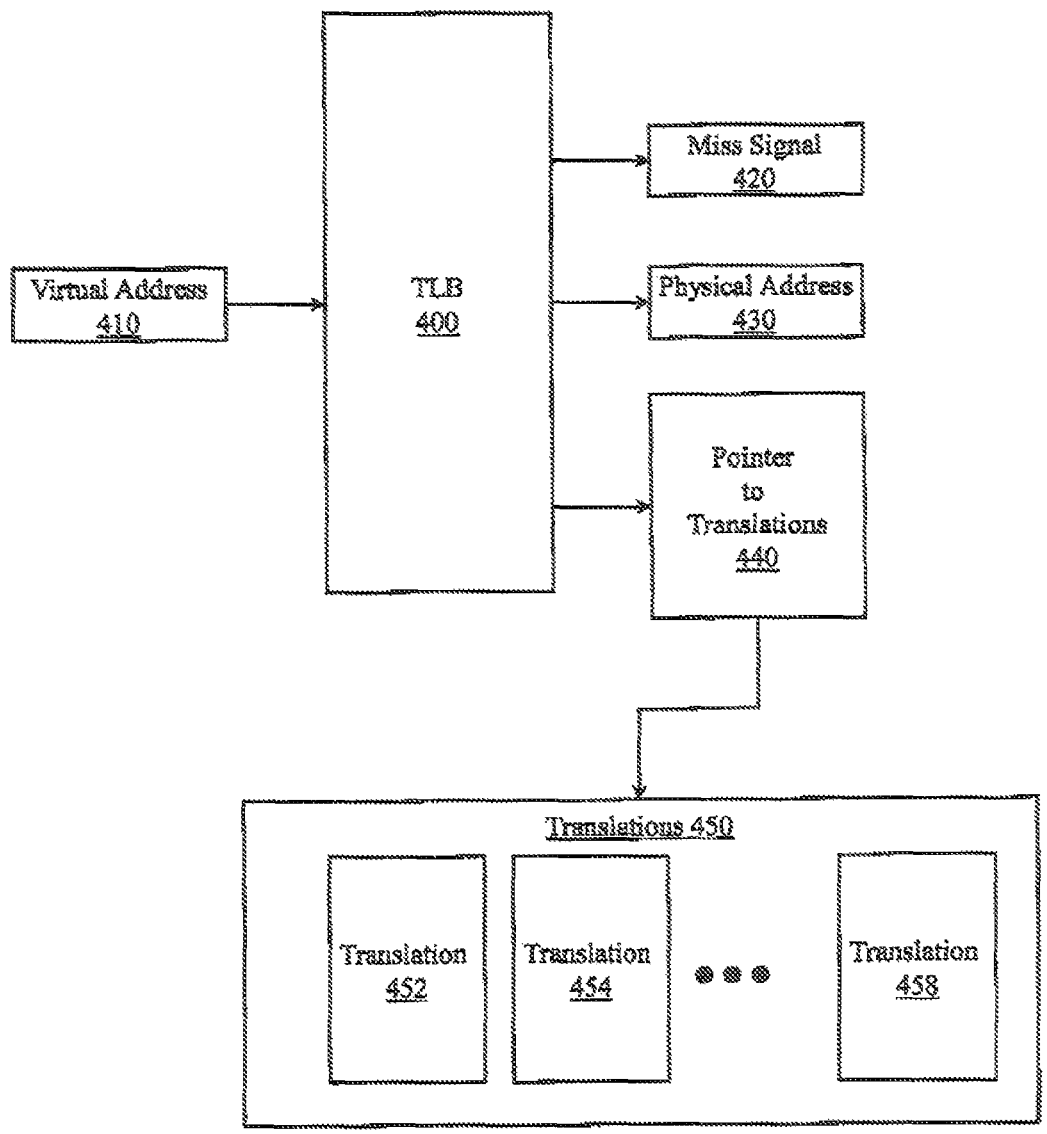
FIG. 4 illustrates an example TLB that provides a miss signal, a physical address, or a pointer to a set of translations.

FIG. 4 illustrates a TLB 400 that receives a virtual address 410 as part of a virtual-to-physical address translation. TLB 400 may store both translations for direct virtual-to-physical translations and may store pointers to translations for single step indirect virtual-to-physical translations. The translations may be stored in a set of translations 450. The set of translations 450 may be organized, for example, as entries (e.g., translation 452, translation 454, . . . translation 458).

After receiving virtual address 410, TLB 400 will provide a miss signal 420, a physical address 430, or a pointer to a set of translations 440. As described above, the pointer may be to a set of pointers to sets of translations, and so on. Since TLB 400 may store both translations and pointers to translations, an entry in TLB 400 may include an identifier to identify whether the entry is storing a translation or a pointer to a translation table. In one example, the identifier is a single bit in the TLB entry. While a single bit is described, one skilled in the art will appreciate that other identifiers may be employed. For example, a two bit identifier may be employed. Comparing TLB 400 to a conventional TLB (e.g., TLB 100 (FIG. 1)) reveals a TLB that can provide three signals instead of two. Two of the signals are the same (e.g., miss signal 420, physical address 430) while the third signal (e.g., pointer to translations 440) does not appear in conventional TLBs (e.g., TLB 100 (FIG. 100)).

Figure 5:
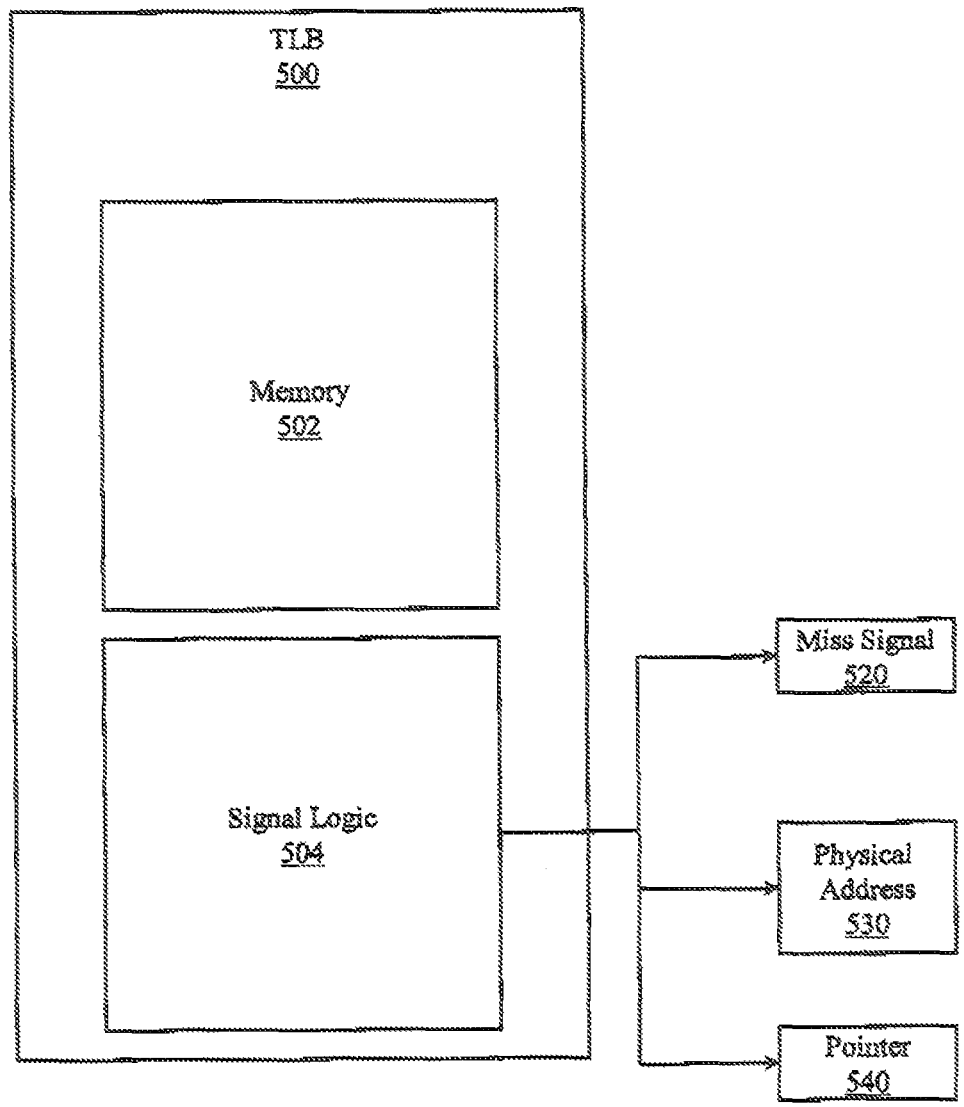
FIG. 5 illustrates an example TLB that provides a miss signal, a physical address, or a pointer to a set of translations.

FIG. 5 illustrates a TLB 500 that provides a miss signal 520, a physical address 530, or a pointer 540 to a set of translations. Like TLB 300 (FIG. 3), TLB 500 includes a memory 502 and a signal logic 504. Signal logic 504 receives a virtual address, looks in memory 602 and determines whether there is a hit or a miss. If there is a miss, then signal logic 504 provides miss signal 520. If there is a hit, signal logic 504 determines the type of hit. Determining the type of hit may include, for example, examining an identifier (e.g., identifier bit(s)) associated with the entry in memory 502 that generated the hit. The identifier facilitates determining whether the hit is associated with a direct virtual-to-physical translation or with an indirect virtual-to-physical translation. If the hit is associated with a direct virtual-to-physical translation, then signal logic 504 provides a physical address 530. If the hit is associated with an indirect virtual-to-physical translation, then signal logic 504 provides a pointer 540. Pointer 540 may then be de-referenced to locate a set of virtual-to-physical translations. While the term "pointer" is used for item 540, one skilled in the art will appreciate that other information (e.g., an index) may be provided by signal logic 504 to facilitate locating virtual-to-physical translation in a set of virtual-to-physical translations.

Figure 6:
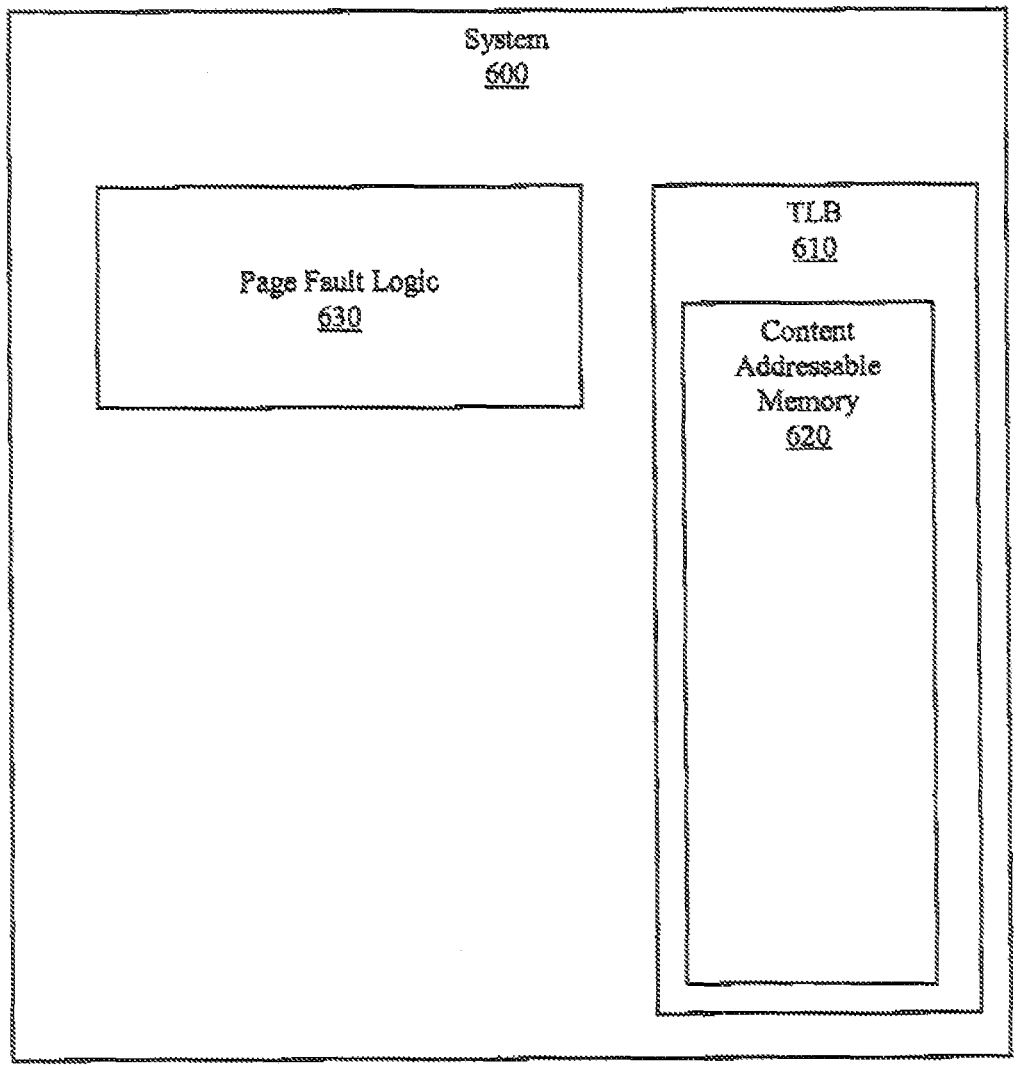
FIG. 6 illustrates an example system that includes a page fault logic and a TLB that provides a miss signal or a pointer to a set of translations.

FIG. 6 Illustrates a system 800 that includes a page fault logic 630 and a TLB 610. The TLB 610 includes a content addressable memory (CAM) 620. System 600 is a portion of a memory management system that performs virtual-to-physical translations for a received virtual address and that performs page fetches. The CAM 620 may be populated with values provided by the page fault logic 630. In one example, CAM 620 stores identifiers (e.g., pointers) to collections of virtual-to-physical page number translations. The collections may be stored, for example, in tables, in content addressable memories, in data structures, and so on. The CAM 620 provides a miss signal upon determining that no entry in CAM 620 corresponds to a received virtual page number. The CAM 620 also provides an identifier upon determining that a CAM 620 entry stores information associated with the received virtual address. In one example the information stored in CAM 620 entry is a pointer associated with the received virtual page number and in another example the information stored in CAM 620 entry is a location at which information to support a virtual-to-physical translation is stored.

Thus, in one example, page fault logic 630 may populate the TLB 610 with the address of a table of virtual-to-physical page number translations in response to resolving a page fault. One skilled in the art will understand that "populating" the TLB 610 may include writing a value to the TLB 610, providing a value to the TLB 610 that the TLB 610 will write to CAM 620, and so on. One skilled in the art will also understand that the identifiers may include addresses, indexes, references, pointers, and so on.

Figure 7:
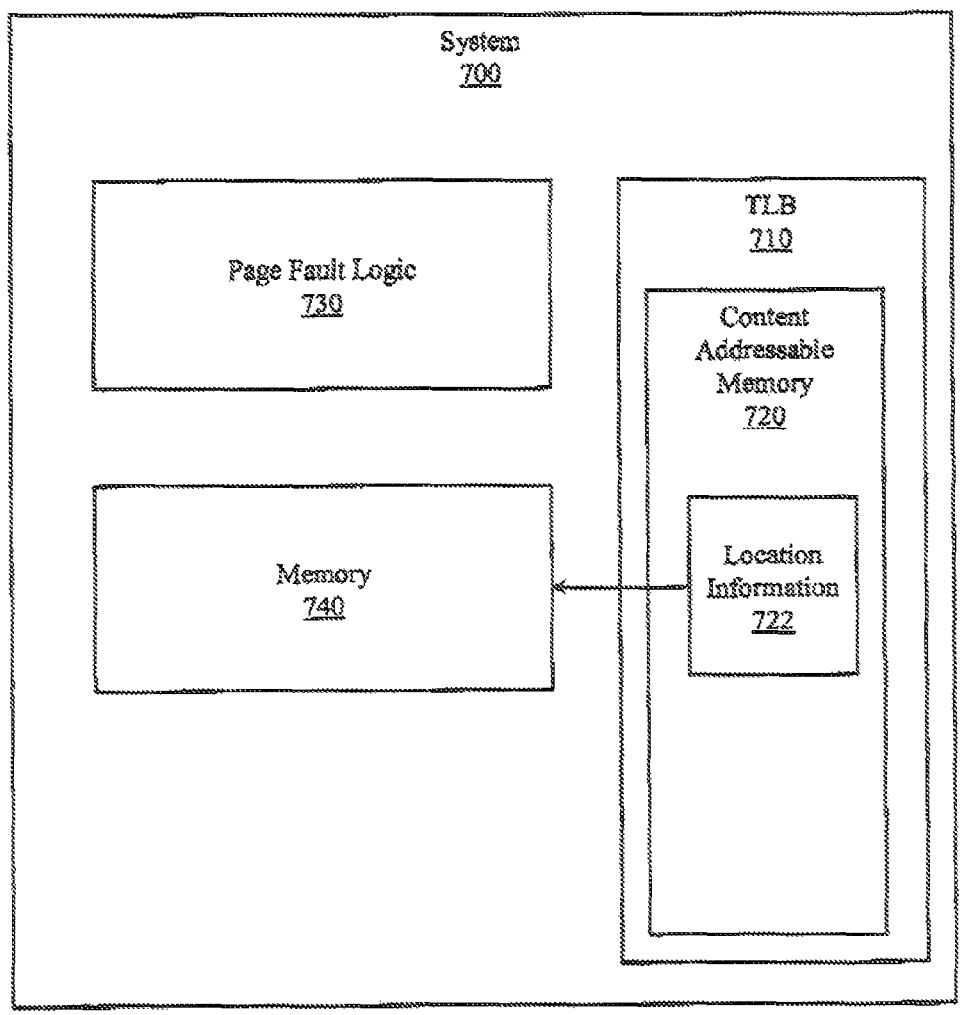
FIG. 7 illustrates an example system that includes a page fault logic, a TLB that provides a miss signal or information associate with finding translations, and a memory to store translations.

FIG. 7 illustrates a system 700 that includes a page fault logic 730, a TLB 710 that includes a CAM 720 and that provides a miss signal or location information for translations stored outside the TLB 710 upon receiving a virtual address as part of a virtual-to-physical address translation. System 700 also includes a memory 740 to store translations. The translations may be organized into sets of translations and thus location information 722 may point to one set of translations. In one example, the translations may be stored in tables in memory 740. While tables are described, it is to be appreciated that memory 740 may organize the translations using other data structures. In one example, the CAM 720 is to store a set of virtual-to-physical page number translations and the page fault logic 730 is to populate the TLB 710 with a virtual-to-physical page number translation in response to resolving a page fault.

Figure 8:
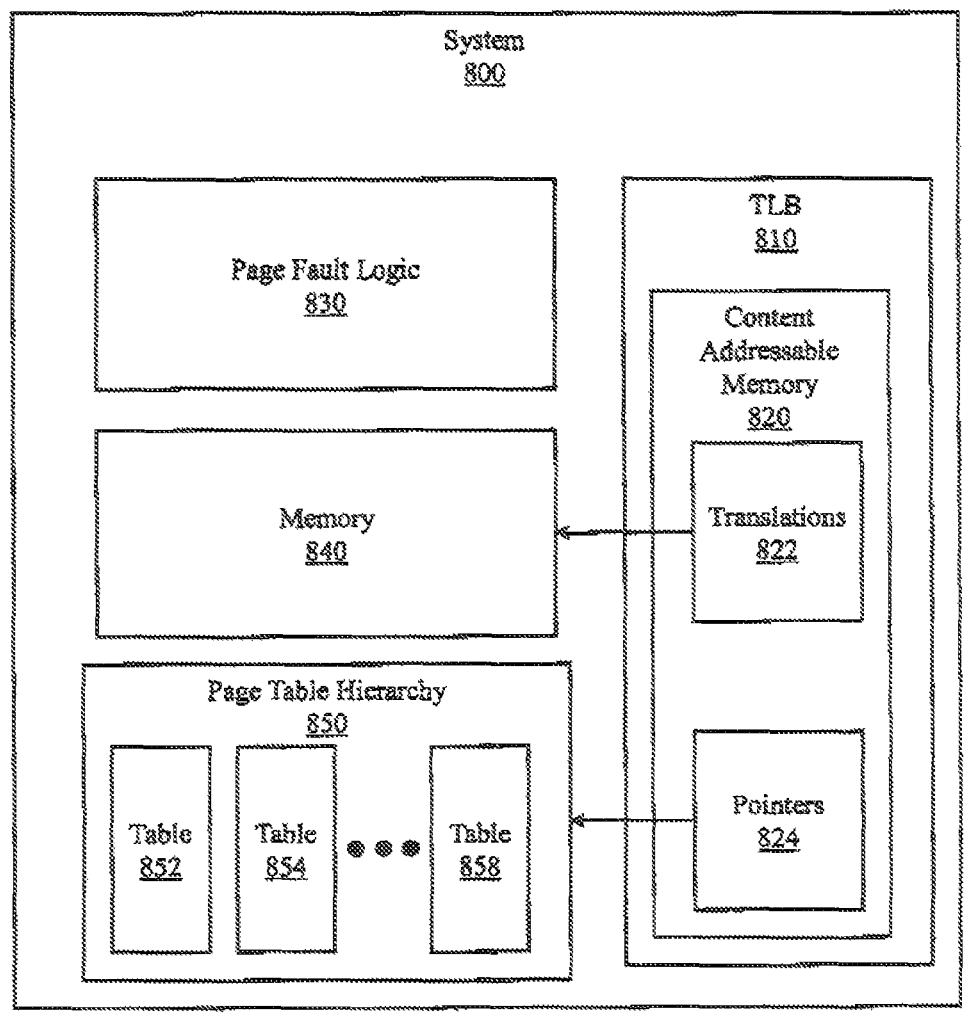
FIG. 8 illustrates an example system that includes a page fault logic, a TLB that provides a miss signal, a pointer to a set of translations, or a translation, a memory to store translations, and a memory to store a page tree hierarchy.

FIG. 8 illustrates a system 800 that includes a page fault logic 830, a TLB 810 that includes a CAM 820 and that provides a miss signal, a pointer to a set of translations, or a translation, in response to receiving a virtual address as part of a virtual-to-physical address translation. System 800 also includes a memory 840 to store translations. System 800 also includes a memory to store a set of page tables arranged in a page table hierarchy 850. One skilled in the art will appreciate that page table hierarchy 850 may store virtual-to-physical address translations associated with pages fetched into memory by page fault logic 830. In one example, the page fault logic 830 may populate (e.g., write, provide) CAM 820 with information associated with performing a virtual-to-physical translation. The information may be, for example, a virtual-to-physical page number mapping. The mapping may be stored as a translation in a translation portion 822 of TLB 810. Over time, CAM 820 may become full as different pages are fetched into memory. Thus, in one example, TLB 810 may selectively replace a virtual-to-physical page number mapping with a pointer to a translation table where the mapping is stored. The information may migrate from translations 822 to pointers 824 and/or to page table hierarchy 850. Over time, even a translation table may become full with information associated with more recently used pages. Thus, system 800 may selectively remove and/or overwrite entries in memory 840. The removal and/or overwriting may be associated with a replacement scheme. One skilled in the art will appreciate that replacement schemes may include, for example, most frequently used, most recently used, least recently used, and so on.

Since CAM 820 may store information for both direct virtual-to-physical mappings (e.g., translations 824) and indirect virtual-to-physical mappings (e.g., pointers 822), an entry in the CAM 820 may include an identifier to distinguish a virtual-to-physical page number translation from a pointer to a table of virtual-to-physical page number translations. System 800 may process virtual addresses of different sizes and thus may process virtual page numbers of different sizes. For example, a virtual page number may be a portion of a 48 bit virtual address, a 21 bit virtual address, a 30 bit virtual address, a 39 bit virtual address, and so on.

System 800 may be a portion of a virtual memory system. System 800 may, therefore, provide means for storing a virtual-to-physical page number translation in a physical memory (e.g., 840) located outside a TLB (e.g., TLB 810) and means for storing in the TLB a pointer to the physical memory. The means may be, for example, logic (e.g., hardware, firmware) associated with resolving page faults. System 800 may also include means for providing a TLB-miss signal in response to determining that the TLB includes no information about a virtual-to-physical address translation requested of the system. The means may be, for example, logic (e.g., hardware, firmware) associated with a CAM in the TLB. System 800 may also provide means for providing a TLB-hit signal in response to determining that the TLB does include information about the virtual-to-physical address translation requested of the system 800. The means may provide a TLB-hit signal that includes information about the physical memory where the translation is stored.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A translation look-aside buffer (TLB), comprising:
   a memory storing a set of pointers, without storing virtual-to-physical address translations, wherein the set of pointers are to a set of tables of virtual-to-physical address translations; and
   a signal logic to:
   receive a virtual address;
   provide a miss signal upon determining that the virtual address is not associated with one of the set of pointers; and
   provide a pointer to one of the tables of virtual-to-physical address translations upon determining that the virtual address is associated with one of the set of pointers.

2. The TLB of claim 1, where a member of the set of pointers to tables of virtual-to-physical address translations is populated in response to resolving a page fault.

3. The TLB of claim 1, where the virtual address is a 48 bit virtual address.

4. The TLB of claim 1, where the virtual address is a portion of one of, a 48 bit virtual address, a 39 bit virtual address, a 30 bit virtual address, and a 21 bit virtual address.

5. The TLB of claim 1, further comprising logic to delete one or more of the set of pointers from the CAM based on an aging scheme.

6. A system, comprising:
   a translation look-aside buffer (TLB) comprising:
   a content addressable memory (CAM) to store a set of pointers to locate virtual-to-physical page number translations stored outside the TLB, wherein the CAM provides a miss signal upon determining that no CAM entry corresponds to a received virtual page number, wherein the CAM provides one of the set of pointers upon determining that a CAM entry corresponds to the received virtual page number, and wherein the CAM is to not store virtual-to-physical page number translations, and
   a page fault logic to populate the CAM with the set of pointers for locating virtual-to-physical page number translations stored outside the TLB in response to resolving a page fault.

7. The system of claim 6, including a memory outside the TLB to store the virtual-to-physical page number translations.

8. The system of claim 6, including a memory outside the TLB to store a set of page tables arranged in a page table hierarchy.

9. The system of claim 6, where the virtual page number is a portion of one of, a 48 bit virtual address, a 21 bit virtual address, a 30 bit virtual address, and a 39 bit virtual address.

10. The system of claim 6, further comprising logic to delete one or more of the set of pointers from the CAM based on an aging scheme.

11. A translation look-aside buffer (TLB), comprising:
    a memory to store a set of pointers, without storing virtual-to-physical address translations, wherein the set of pointers are to tables of virtual-to-physical address translations; and
    a signal logic to:
    receive a virtual address;
    provide a miss signal upon determining that the virtual address is not associated with any of the set of pointers; and
    provide one of the set of pointers to one of the tables of virtual-to-physical address translations upon determining that the virtual address is associated with one of the set of pointers.

12. The TLB of claim 11, further comprising logic to delete one or more of the set of pointers from the memory based on an aging scheme.

13. A method, comprising:
    storing a virtual-to-physical page number translation in a physical memory located outside a translation look-aside buffer (TLB), the TLB not storing any virtual-to-physical address translations;
    storing in the TLB a set of pointers to the physical memory;
    providing a TLB-miss signal in response to determining that the TLB includes no information about a requested virtual-to-physical address translation stored in the physical memory located outside the TLB; and
    providing a TLB-hit signal in response to determining that the TLB does include a pointer to the requested virtual-to-physical address translation, where the TLB-hit signal includes the pointer.

14. The method of claim 13, further comprising deleting one or more of the set of pointers from the TLB based on an aging scheme.

* * * * *